(12) United States Patent
Weinert et al.

(10) Patent No.: US 10,041,352 B2
(45) Date of Patent: Aug. 7, 2018

(54) STATOR OF A TURBINE OF A GAS TURBINE WITH IMPROVED COOLING AIR ROUTING

(71) Applicant: Rolls-Royce Deutschland Ltd & Co KG, Blankenfelde-Mahlow (DE)

(72) Inventors: Markus Weinert, Rangsdorf (DE); Tobias Leymann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 386 days.

(21) Appl. No.: 15/057,288

(22) Filed: Mar. 1, 2016

(65) Prior Publication Data

US 2016/0258293 A1 Sep. 8, 2016

(30) Foreign Application Priority Data

Mar. 4, 2015 (DE) .......................... 10 2015 203 872

(51) Int. Cl.
*F01D 9/04* (2006.01)
*F01D 5/08* (2006.01)
(Continued)

(52) U.S. Cl.
CPC ............... *F01D 5/081* (2013.01); *F01D 9/02* (2013.01); *F01D 11/005* (2013.01);
(Continued)

(58) Field of Classification Search
CPC .......... F01D 5/081; F01D 9/041; F01D 11/05; F05D 2240/81; F05D 2240/11; F05D 2240/57; F05D 2260/202
See application file for complete search history.

(56) References Cited

U.S. PATENT DOCUMENTS 3,752,598 A * 8/1973 Bowers ................. F01D 11/005
415/115
5,167,485 A * 12/1992 Starkweather ........ F01D 11/005
415/115
(Continued)

FOREIGN PATENT DOCUMENTS

DE 102009004792 A1 7/2010
EP 0902167 A1 3/1999
(Continued)

OTHER PUBLICATIONS

German Search Report dated Nov. 9, 2015 for counterpart German application No. DE 10 2015 203 812.6.
(Continued)

*Primary Examiner* — Ninh H Nguyen
(74) *Attorney, Agent, or Firm* — Shuttleworth & Ingersoll, PLC; Timothy Klima

(57) ABSTRACT

A stator of a turbine of a gas turbine, having a flow duct in which stator vanes are arranged, each vane having an outer and an inner vane platform, and each having a cooling air chamber formed by adjacent vane platforms for passing through cooling air, characterized in that the resultant cooling air chamber and/or a platform intermediate gap are designed such that starting from a side of the vane platform facing the adjacent vane platform, at least one outflow pocket open to a platform upper side and connected to the cooling air chamber is formed, and that in the wall of the cooling air chamber, at least one cooling air pocket opened radially inwards to the cooling air chamber and limited by an intermediate element or a sealing strip is formed and opens to the platform intermediate gap.

13 Claims, 3 Drawing Sheets

Figure 1:
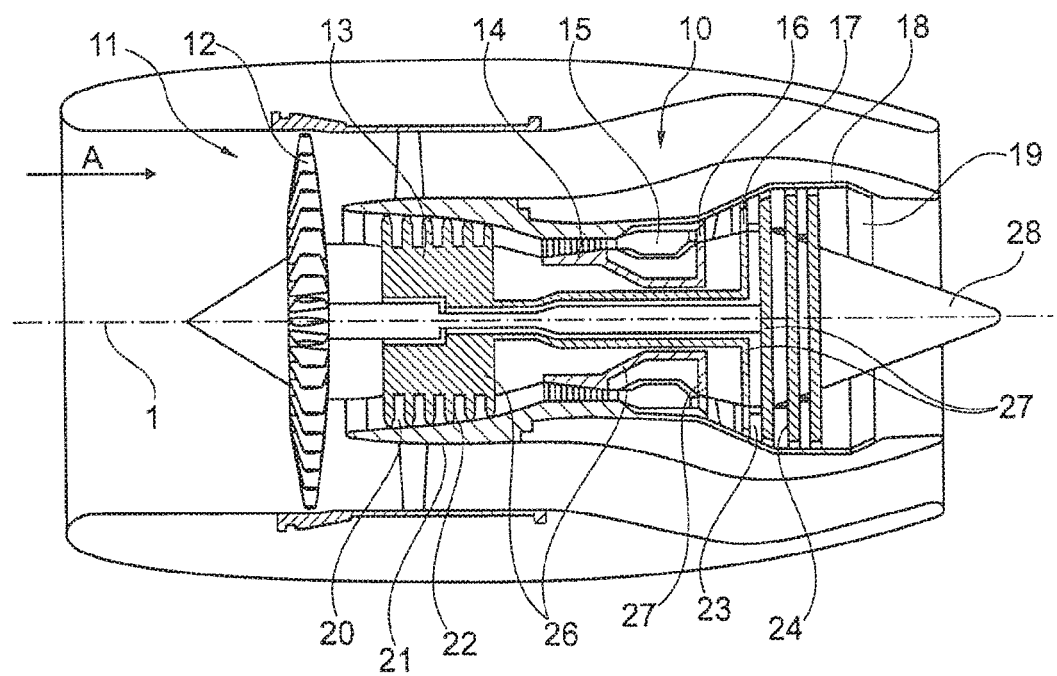

(51) Int. Cl.
 *F01D 9/02* (2006.01)
 *F01D 11/00* (2006.01)
(52) U.S. Cl.
 CPC .... *F05D 2240/81* (2013.01); *F05D 2260/202* (2013.01); *Y02T 50/676* (2013.01)

(56) References Cited

U.S. PATENT DOCUMENTS

| | | | |
|---|---|---|---|
| 5,531,457 A | 7/1996 | Tibbott et al. | |
| 6,261,053 B1 | 7/2001 | Anderson et al. | |
| 8,684,673 B2 * | 4/2014 | Salazar | F01D 11/005 277/644 |
| 2009/0263235 A1 | 10/2009 | Tibbott et al. | |

FOREIGN PATENT DOCUMENTS

| | | |
|---|---|---|
| EP | 1033477 A2 | 9/2000 |
| GB | 2280935 A | 2/1995 |
| WO | WO2007063128 A1 | 6/2007 |
| WO | WO2008122507 A1 | 10/2008 |

OTHER PUBLICATIONS

European Search Report dated Mar. 27, 2017 from counterpart European App No. 16158540.1.

* cited by examiner

STATOR OF A TURBINE OF A GAS TURBINE WITH IMPROVED COOLING AIR ROUTING

This application claims priority to German Patent Application 102015203872.6 filed Mar. 4, 2015, the entirety of which is incorporated by reference herein.

This invention relates to a stator of high-pressure turbine and/or an intermediate-pressure turbine and/or a low-pressure turbine of an aircraft gas turbine or a stationary industry gas turbine in accordance with features disclosed herein.

In detail, the invention relates to the design of inner and/or outer vane platforms, on each of which one or more stator vanes are provided. A cooling air chamber is provided between the vane platforms to pass cooling air between adjacent vane platforms.

For cooling vane platforms of stator vanes, the state of the art shows a possible solution variant using film cooling holes. They have the disadvantages of expensive manufacture and the risk of the occurrence of blockages of the holes due to foreign particles, and uneven distribution of the cooling air film occurring under certain conditions, and/or defective formation of a cooling air film due to production-related limitations. Under certain circumstances the accessibility for tools for manufacturing the film cooling holes mentioned is also limited.

It is known from U.S. Pat. No. 5,531,457 A to provide between adjacent stator vane platforms a gap through which cooling air can flow out. The width of this gap changes depending on the thermal conditions, so that the gap is increasingly closed during thermal expansion. The exit of cooling air out of this gap does not permit this cooling air to be routed in a targeted manner onto the surface of the vane platform.

WO 2007/063128 A1 shows in a similar design only a gap between adjacent rotor blade platforms which increasingly closes during thermal expansion of the blade platforms and then either permits an outflow of cooling air only to a limited extent or prevents it completely. An outflow of cooling air is therefore also dependent on the platform intermediate gap.

A further design is shown in U.S. 2009/0263235 A1. Here too, a gap is provided between the adjacent rotor blade platforms and also closes during thermal expansion of the blade platforms. The gap is arranged at an angle to the surface of the blade platforms.

The object underlying the present invention is to provide a stator of the type mentioned at the beginning, which while being simply designed and easily and cost-effectively producible enables an efficient reduction of the surface metal temperature of the inner or outer vane platforms.

It is a particular object to provide a solution to the above problems by a combination of features as disclosed herein. Further advantageous embodiments will become apparent from the present disclosure.

The invention thus describes a stator of a turbine of a gas turbine, having a flow duct in which stator vanes are arranged, each vane having an outer and an inner vane platform, and each having a cooling air chamber formed by adjacent vane platforms or a cooling air plenum for passing through cooling air, where the resultant cooling air chamber and/or a platform intermediate gap are designed such that starting from a side of the vane platform facing the adjacent vane platform, at least one outflow pocket open to a platform upper side and connected to the cooling air chamber is formed, and where, in the wall of the cooling air chamber, at least one cooling air pocket opened radially inwards to the cooling air chamber is formed and opens to the platform intermediate gap.

In accordance with the invention, it is thus provided that the cooling air is passed through the outflow pocket, and in this way an exit of the cooling air and in particular the formation of a cooling air film on the platform upper side are provided.

In accordance with the invention, an outflow pocket is thus provided on the surface of the respective vane platform. This outflow pocket is thus arranged radially on the outside, on the surface or upper side of the vane platform, and extends both in the axial direction and in the circumferential direction. The depth of the outflow pocket is provided in the radial direction. The result is therefore an outflow pocket provided for the outflow of the cooling air which extends in all three dimensions and is shaped for an optimized flow. Unlike in the state of the art, in which only simple slots or grooves are provided between the vane platforms, the outflow pocket in accordance with the invention thus permits, even when the platform intermediate gap is closed due to thermal expansions, direct and targeted film cooling of the platform upper side. Whereas in the state of the art the slots or grooves between the vane platforms necessitate multiple deflections in the flow of cooling air, the possibility is created in accordance with the invention of achieving at every operating point an undisrupted outflow of the cooling air without any deflection.

Furthermore, with the present invention a cooling air pocket opened radially inwards to the cooling air chamber is provided in the wall of the cooling air chamber and opens towards the platform intermediate gap. Due to this additional cooling air pocket cooling air is introduced into the outflow pocket(s) in an optimum manner.

With the embodiment in accordance with the invention, it is possible to further reduce the surface metal temperature on the platform compared with cooling according to the state of the art, or to improve the cooling air distribution.

In accordance with the invention, the total flow duct for cooling air is formed using the adjacent vane platforms, their cooling air pockets and outflow pockets, as well as the intermediate elements/sealing strips. In accordance with the invention, expensive-to-manufacture internal and/or closed cooling air ducts (film cooling holes) can thus be dispensed with.

The cooling air pocket can, in accordance with the invention, be designed convergent or divergent. It is furthermore particularly favourable when the outflow pocket is opened or arranged at the shallowest possible angle, ideally at an angle between 0° and 35°, to the platform upper side. Alternatively, the outflow pocket can also be designed as a free-form surface for improved flow, with this design preferably being provided in both planes. These measures improve the adherence of a cooling air film on the surface of the vane platform. It also helps to improve the flow when the outflow pocket and/or the cooling air pocket are each provided with free-formed surfaces and/or walls. In particular, a divergent shape of the cooling air pocket (similar to a diffuser) permits on the one hand a reduction in speed and on the other hand an increase in the pressure of the cooling air mass flow, leading to an improved formation of the film. Seen in a radial section and in a top view (cf. FIGS. 3 and 4), the outflow pocket is profiled such that it is tangentially approximating both to the curvature of the vane platform upper side and the main flow (hot gas). With the embodiment in accordance with the invention, only low pressure losses of the cooling airflow result, as this flow only has to be deflected very little or not at all. In contrast to this, the designs in the state of the art show the requirement to deflect the cooling airflow several times, in particular to apply the exiting cooling airflow onto the surface of the vane platform and/or to pass it around a sealing element. This also results in a greater risk of a blockage due to pollution. This risk is largely minimized in accordance with the invention.

It can furthermore be provided that the described design of the outflow pocket and/or the cooling air pocket is provided in similar form on the outer hot gas platform surface (blade tip). The outflow pocket can also have a further through-flow recess in an integral design with predominantly radial orientation.

Figure 2:
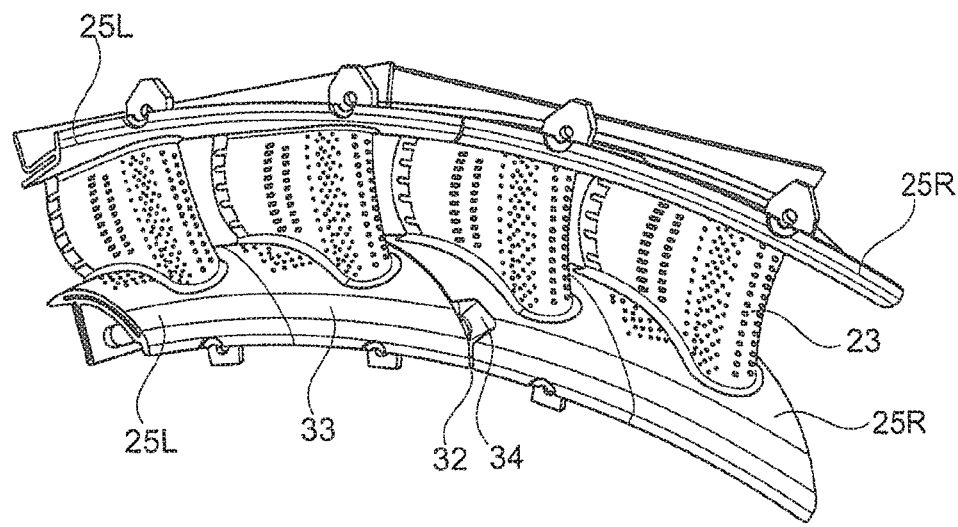
Figure 4:
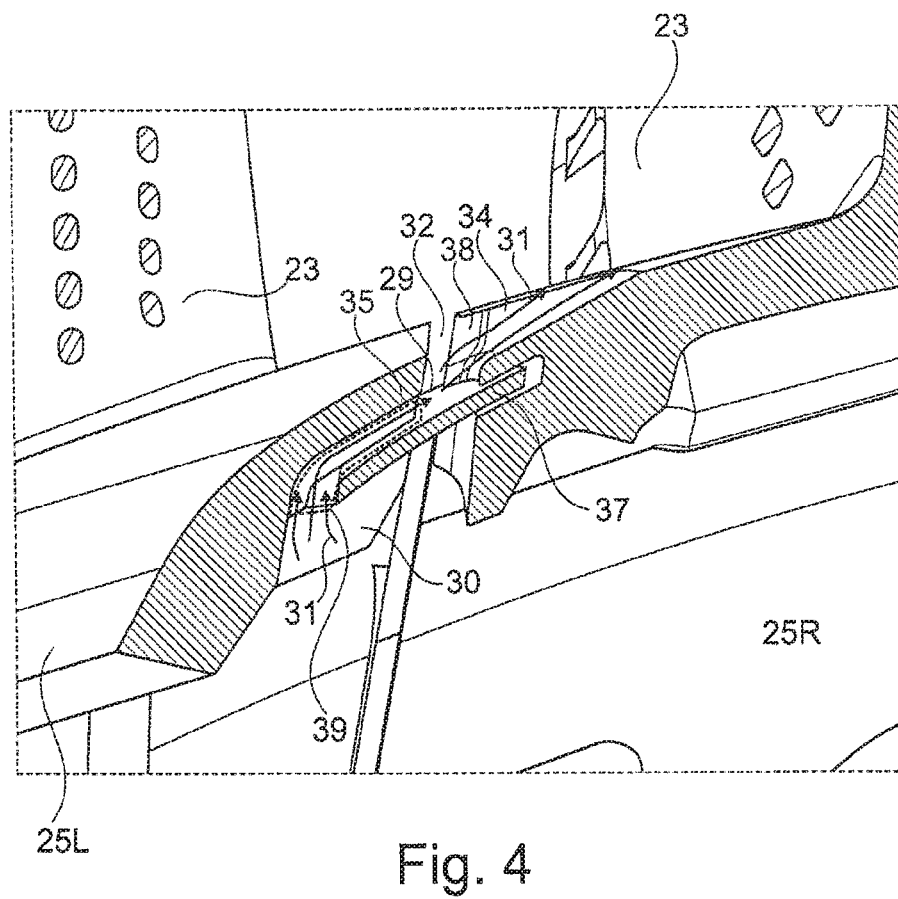
Figure 3:
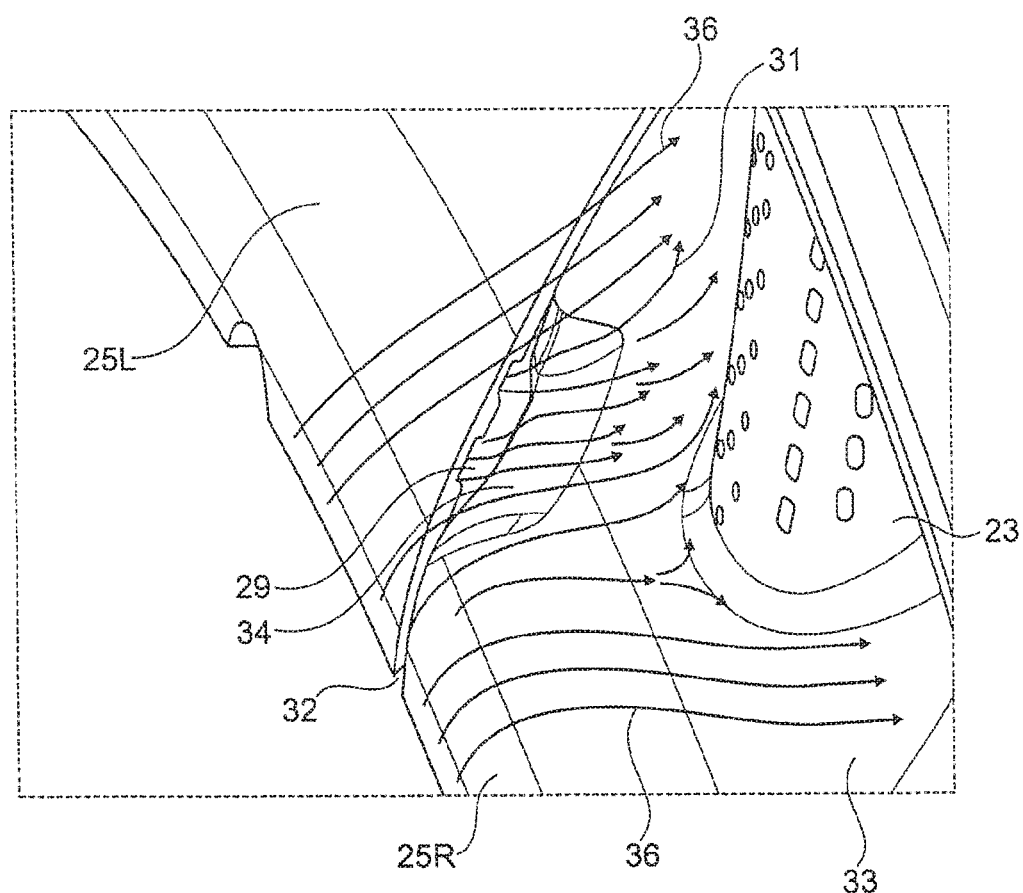

The present invention is described in the following on the basis of an exemplary embodiment in light of the accompanying drawing. In the drawing, FIG. 1 shows a schematic representation of a gas-turbine engine in accordance with the present invention, FIG. 2 shows a perspective partial view of stator vanes in accordance with the present invention, with appertaining vane platforms, FIG. 3 shows an enlarged perspective partial view of an outflow pocket, and FIG. 4 shows a sectional view, by analogy with FIG. 3.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation. The reference numeral 28 indicates an exhaust cone.

FIG. 2 shows a perspective partial view of a stator in accordance with the invention, having stator vanes 23 that are connected to outer and inner vane platforms 25. A platform intermediate gap 32 is shown between the vane platforms 25. As shown in FIGS. 2 to 4, in each case the left-hand vane platform is identified as 25L and the right-hand vane platform as 25R. The vane platforms 25 extend, as is usual in a stator of a turbine, in annular form in the circumferential direction. The multiple recesses in the vane platform are cooling air recesses in accordance with the state of the art.

The following description relates, in order to simplify the illustration, to the radially inner vane platform (relative to the engine axis 1), but the invention can in analogous form also be provided on the outer vane platform.

FIG. 2 shows an outflow pocket 34, through which cooling air 31 exits and is routed to a platform upper side 33. The cooling air 31 flows out of outflow openings 29, as is shown in FIG. 3. The exiting cooling air 31 follows the profile of the outflow pocket 34, the platform upper side 33 and the profile of the stator vane 23, and creates a cooling film on the surface of the platform upper side 33. FIG. 3 shows the flow of the hot gas with the reference numeral 36.

As is shown in particular by the illustration in FIG. 2, the outflow pocket 34 is incorporated three-dimensionally as a free-form surface into the surface of the vane platform, so that the cooling air can be effectively applied as a cooling air film onto the surface of the vane platform. The supply of cooling air is achieved, as described in the following, not through the platform intermediate gap as in the state of the art, but instead through the outflow pocket. For that reason, there is no risk either in accordance with the invention that the cooling air supply is reduced or completely interrupted when the platform intermediate gap is closed due to thermal expansion of the vane platforms.

FIG. 4 shows a sectional view of the exemplary embodiment according to FIGS. 2 and 3. It can be seen here in particular that the cooling air 31 flowing out through the outflow openings 29 is routed through a cooling air pocket 35. The cooling air 31 flows into said pocket from a cooling air chamber 30.

FIG. 4 furthermore shows an intermediate element/ sealing strip 37 acting as a seal for the platform intermediate gap and, in accordance with the invention, forming together with the cooling air pocket 35 a cooling air duct 39 which determines the cooling air mass flow and routes the cooling air, respectively.

To form the cooling air pocket 35, the wall thickness of the vane platform must only locally be reduced. The shape of the cooling air pockets 35 (cooling ducts) can differ in design, for example have a rectangular cross-section, an oval cross-section, be angular or rounded. It is furthermore possible to vary the angle between the cooling air pocket 35 and the platform upper side 33 to create optimum flow and mass flow conditions for the respective application.

It is thus provided in accordance with the invention that cooling air pockets 35 for improving the flow paths and for affecting the temperature and pressure are designed convergent or divergent or that rounded forms are used, in contrast to the conventionally used film cooling holes. A divergent shape, which is designed rounded, has proven particularly advantageous for reducing the speed and the dynamic pressure of the cooling airflow and thereby increasing the static pressure and reducing the temperature. Furthermore, a more even distribution of the cooling air over the axial length of the platform is achieved, see also FIG. 3 in this connection.

In accordance with the invention, the number and the position of the cooling air pockets can be varied over the entire axial length of the vane platform depending on the cooling requirements.

FIG. 3 furthermore shows that in the adjacent vane platform (right-hand vane platform as per FIG. 3) an outflow pocket 34 is formed, into the inflow opening 38 of which the cooling air flowing out of the outflow opening 29 of the cooling air pocket 35 enters. This cooling air is routed at a shallow angle to the surface or platform upper side 33, such that both favourable flow conditions and optimized temperature and pressure conditions result. The outflow pocket 34 ensures a direct and unhindered flow of cooling air between the inlet of the cavity underneath the inner vane platform (cooling air chamber 30 or cooling air plenum) and the outlet from the convex platform upper side 33. As shown in FIG.

3, the cooling air film can, using the outflow pocket 34, propagate better on the platform upper side 33 and is less prone to separation. In particular, these features ensure an increase in cooling effectiveness. The shape of the outflow pocket 34 can be adapted to the requirements, but is however preferably designed with the shallowest possible rise and heavily rounded to prevent separation of the cooling air film as well as separation edges and hence swirling and losses.

A further advantage of the outflow pocket 34 is that tolerance-related radial steps between adjacent vane platforms 25 can be reduced, to prevent the main flow separating due to an edge and so causing additional flow losses with the reduction in turbine efficiency thereby involved.

The embodiment of the outflow pocket 34 can be varied in shape, geometry, angle, number, length and position to conform to the cooling requirements. It is for example possible in accordance with the invention to provide the outflow pocket 34 over the entire axial length of the vane platform 25. As a result, on the one hand the losses due to the tolerance-related radial steps between adjacent vane platforms 25 are reduced and on the other hand the rear part too of the vane platform 25 is effectively cooled.

In accordance with the invention, a second outflow pocket can also be provided which ensures that even with a closed platform intermediate gap 32 between adjacent vane platforms a sufficient cooling air mass flow is possible.

In accordance with the invention, the following advantages result: In accordance with the invention, a larger area can be cooled than with conventional film cooling holes, with lower production expenditure.

The embodiment in accordance with the invention can be produced with existing manufacturing methods, and can for example be cost-effectively achieved when casting the vane platforms.

The solution in accordance with the invention is furthermore less prone to contamination and blockage due to foreign objects. The ratio between width and height of the cooling air pocket can be changed without negatively affecting the radial position, in order to achieve a reduction in the proneness to blockages.

The result is a greater flexibility in the geometry of the cooling ducts compared with conventional film holes, in particular of the cooling air pocket 35 and the outflow pocket 34. This is advantageous in an integral design in particular. The overall result is targeted optimization of the platform cooling.

The invention assures a reduction in the flow losses with tolerance-related steps between adjacent vane platforms.

The invention is applicable to both, aircraft gas turbines and stationary industry gas turbines or, generally speaking, to gas turbines or turbomachines.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Vane platform
26 Compressor drum or disk
27 Turbine rotor hub
28 Exhaust cone
29 Outflow opening
30 Cooling air chamber
31 Cooling air
32 Platform intermediate gap
33 Platform upper side
34 Outflow pocket
35 Cooling air pocket
36 Hot gas
37 Intermediate element/sealing strip
38 Inflow opening
39 Cooling air duct

What is claimed is:

1. A stator of a turbine of a gas turbine, comprising:
a flow duct;
a plurality of stator vanes arranged in the flow duct, each of the plurality of stator vanes including an outer vane platform and an inner vane platform,
a platform intermediate gap formed between adjacent vane platforms;
a cooling air chamber formed by the adjacent vane platforms for passing through cooling air, at least one cooling air pocket formed on a wall of the cooling air chamber on a first one of the adjacent vane platforms, the at least one cooling air pocket opening radially inward to the cooling air chamber and opening to the platform intermediate gap,
an intermediate element or a sealing strip positioned between the adjacent blade platforms limiting the at least one cooling air pocket,
at least one outflow pocket positioned on a second one of the adjacent blade platforms opening to an upper side of the second one of the adjacent blade platforms and connecting to the cooling air chamber via the at least one cooling air pocket.

2. The stator in accordance with claim 1, wherein the at least one cooling air pocket consists of only one cooling air pocket arranged on the first one of the adjacent blade platforms.

3. The stator in accordance with claim 1, wherein the at least one cooling air pocket is convergent.

4. The stator in accordance with claim 1, wherein the outflow pocket is arranged at a shallow angle or tangentially to the upper side of the second one of the adjacent blade platforms.

5. The stator in accordance with claim 1, wherein the at least one outflow pocket includes surfaces freely merging into one another.

6. The stator in accordance with claim 1, wherein walls of the at least one cooling air pocket freely merge into one another.

7. The stator in accordance with claim 1, wherein the at least one outflow pocket includes an integral further through-flow recess having a predominantly radial orientation.

8. The stator in accordance with claim 1, wherein the at least one outflow pocket includes a plurality of outflow pockets arranged over an axial length of the second one of the adjacent blade platforms.

9. The stator in accordance with claim 1, wherein at least one cooling air pocket includes a plurality of cooling air pockets arranged over an axial length of the first one of the adjacent vane platforms.

10. The stator in accordance with claim 9, wherein the plurality of cooling air pockets partially or completely merge into one another.

11. The stator in accordance with claim 1, wherein at least one chosen from the at least one outflow pocket and the at least one cooling air pocket is provided on a radially outer hot gas surface of a respective one of the adjacent vane platforms.

12. The stator in accordance with claim 1, wherein the at least one cooling air pocket is divergent.

13. The stator in accordance with claim 1, wherein the at least one outflow pocket includes one outflow pocket covering an entire axial length of the second one of the adjacent blade platforms.

\* \* \* \* \*